(12) United States Patent
Kimura et al.

(10) Patent No.: US 9,897,823 B2
(45) Date of Patent: Feb. 20, 2018

(54) COLORED POLARIZING FILMS, COLORED POLARIZING SHEETS, AND COLORED POLARIZING LENSES, AND METHODS THEREOF

(71) Applicants: MITSUBISHI GAS CHEMICAL COMPANY, INC., Tokyo (JP); MGC FILSHEET CO., LTD., Saitama (JP)

(72) Inventors: Hideaki Kimura, Saitama (JP); Masayuki Akaki, Saitama (JP); Taisuke Sasagawa, Saitama (JP); Toshihiko Takano, Saitama (JP); Terutaka Tokumaru, Tokyo (JP)

(73) Assignees: MITSUBISHI GAS CHEMICAL COMPANY, INC., Tokyo (JP); MGC FILSHEET CO., LTD., Saitama (JP)

( * ) Notice: Subject to any disclaimer, the term of this patent is extended or adjusted under 35 U.S.C. 154(b) by 0 days.

(21) Appl. No.: 14/422,730

(22) PCT Filed: Aug. 19, 2013

(86) PCT No.: PCT/JP2013/072087
§ 371 (c)(1),
(2) Date: Feb. 20, 2015

(87) PCT Pub. No.: WO2014/030611
PCT Pub. Date: Feb. 27, 2014

(65) Prior Publication Data
US 2015/0234210 A1    Aug. 20, 2015

(30) Foreign Application Priority Data

Aug. 21, 2012  (JP) ................ 2012-182167
Aug. 21, 2012  (JP) ................ 2012-182423

(51) Int. Cl.
| | |
|---|---|
| *G02C 7/02* | (2006.01) |
| *G02C 7/10* | (2006.01) |
| *G02C 7/12* | (2006.01) |
| *G02B 1/08* | (2006.01) |
| *G02B 5/30* | (2006.01) |
| *B29C 65/48* | (2006.01) |
| *B29C 45/16* | (2006.01) |
| *B29D 11/00* | (2006.01) |
| *G02B 1/04* | (2006.01) |
| *B29K 69/00* | (2006.01) |
| *B29K 269/00* | (2006.01) |

(52) U.S. Cl.
CPC ............ *G02C 7/12* (2013.01); *B29C 45/1676* (2013.01); *B29C 65/48* (2013.01); *B29D 11/00644* (2013.01); *G02B 1/041* (2013.01); *G02B 1/08* (2013.01); *G02B 5/3025* (2013.01); *G02C 7/022* (2013.01); *G02C 7/024* (2013.01); *G02C 7/10* (2013.01); *G02C 7/104* (2013.01); *G02C 7/105* (2013.01); *G02C 7/108* (2013.01); *B29K 2069/00* (2013.01); *B29K 2269/00* (2013.01); *B29K 2995/002* (2013.01); *B29K 2995/0034* (2013.01); *G02C 2202/16* (2013.01); *Y10T 156/1002* (2015.01)

(58) Field of Classification Search
CPC .......... G02C 7/12; G02C 7/022; G02C 7/024; G02C 7/10; G02C 7/104; G02C 7/105; G02C 7/108; G02C 2202/16; G02B 1/041; G02B 1/08; G02B 5/3025; B29D 11/00644
See application file for complete search history.

(56) References Cited

U.S. PATENT DOCUMENTS

| | | | |
|---|---|---|---|
| 4,859,039 A * | 8/1989 | Okumura ............... | G02B 5/205 359/487.02 |
| 5,751,481 A * | 5/1998 | Dalzell ................ | B29C 51/428 264/1.32 |
| 5,751,483 A | 5/1998 | Itoh et al. | |
| 5,926,310 A | 7/1999 | Tamura et al. | |

(Continued)

FOREIGN PATENT DOCUMENTS

| | | |
|---|---|---|
| EP | 0605191 | 7/1994 |
| EP | 0 605 191 | 6/1998 |

(Continued)

OTHER PUBLICATIONS

U.S. Appl. No. 14/422,743 to Hideaki Kimura et al., which was filed Feb. 20, 2015.
Search report from PCT/JP2013/072087, dated Sep. 24, 2013.
Extended European Search Report issued in Patent Application No. 13830802.8, dated Feb. 17, 2016.
Office Action issued in Taiwan Counterpart Patent Appl. No. 102129953, dated Oct. 5, 2016.

(Continued)

*Primary Examiner* — Jordan Schwartz
(74) *Attorney, Agent, or Firm* — Greenblum & Bernstein, P.L.C.

(57) ABSTRACT

A polarizing film is produced by swelling a polyvinyl alcohol film with water, uniaxially stretching it, dyeing it with an organic dichroic dye, and drying it, wherein a dichroic organic dye composition includes a combination of organic dyes having a dichroic ratio of 13 or higher used in an amount to keep the degree of polarization at 90% or more, and wherein the coloration dye composition comprises a combination of dyes having extremely low dichroic ratios of 4 or less or substantially having no dichroic ratio, laminating at least one layer of a transparent plastic sheet onto at least both sides of the polarizing film, curving the polarizing sheet so as to impart spherical or aspherical surfaces thereto to obtain a polarizing and injecting a transparent resin to the concave surface of the curved polarizing sheet to obtain an injection polarizing lens.

25 Claims, No Drawings

(56) References Cited

U.S. PATENT DOCUMENTS

| | | | | |
|---|---|---|---|---|
| 2003/0063255 A1* | 4/2003 | Moravec | ............... | G02B 1/041 |
| | | | | 351/159.27 |
| 2008/0038544 A1* | 2/2008 | Kitaike | ............ | B29C 45/14811 |
| | | | | 428/336 |
| 2009/0051058 A1 | 2/2009 | Ogomi et al. | | |
| 2009/0174942 A1* | 7/2009 | Sadamitsu | ............ | C09B 31/072 |
| | | | | 359/487.02 |
| 2013/0314786 A1* | 11/2013 | Higeta | .................... | G02B 1/04 |
| | | | | 359/487.02 |

FOREIGN PATENT DOCUMENTS

| EP | 1394595 | 3/2004 |
|---|---|---|
| JP | 3-39903 | 2/1991 |
| JP | 6-242318 | 9/1994 |
| JP | 8-52817 | 2/1996 |
| JP | 8-313701 | 11/1996 |
| JP | 9-5683 | 1/1997 |
| JP | 10-133016 | 5/1998 |
| JP | 2007-127893 | 5/2007 |
| JP | 2008-165200 | 7/2008 |
| TW | 200848807 | 12/2008 |

OTHER PUBLICATIONS

Fan Zhi-xin, "A Course of Polarizer Knowledge Part Four The Structure and Manufacture of Polarizer"; Advanced Display; May 31, 2012; pp. 5-11.

Chinese Office Action issued in Counterpart Patent Appl. No. 201380043149.1, dated Mar. 21, 2017, along with an english translation thereof.

\* cited by examiner

COLORED POLARIZING FILMS, COLORED POLARIZING SHEETS, AND COLORED POLARIZING LENSES, AND METHODS THEREOF

TECHNICAL FIELD

The present invention relates to a method for a polarizing film that shows a desired total light transmittance and a desired degree of polarization when it is used in sunglasses. The polarizing film also shows little change in color tone and transmittance and its color tone can be more flexibly selected. The present invention also relates to a polarizing sheet that is obtained from the polarizing film produced by the method, a polarizing lens obtained by curving the sheet to make curved surfaces, or an aromatic polycarbonate polarizing lens obtained by injecting an aromatic polycarbonate into one side of the curved surfaces.

BACKGROUND

To make a polarizing sheet, generally a polarizing film that is obtained by absorbing or impregnating iodine or dichroic dyes into a monoaxially stretched polyvinyl alcohol (PVA) film is used. Generally, transparent resins, such as triacetylcellulose, are used on one or both sides of the polarizing film as a protective layer to make a polarizing plate. Such a polarizing plate is easily handled and is useful for secondary processing. Further, it is cheap and light.

According to the properties of resins used in protective layers, when the resin is a polycarbonate, since it has superior impact resistance, as well as high heat resistance, a polarizing sheet made from the polycarbonate is used to produce lenses for the sunglasses or the goggles obtained by a curving process and an injection-molding process.

However, since, for example, the aromatic polycarbonate has a large photoelastic constant, if the aromatic polycarbonate is curved to make a spherical or aspherical surface, such as in sunglasses or goggles, interference fringes in coloration easily arise by the retardation of the polycarbonate, and as a result, the interference fringes cause problems such as deterioration in the appearance of the article and eyestrain.

Further, in a polarizing lens obtained by curving a polarizing sheet to make a spherical or an aspherical surface, because of unevenness of the thickness of the aromatic polycarbonate polarizing sheet, distortion of images occurs. Therefore, the polarizing lens has problems in terms of causing deterioration in the appearance of the article and eyestrain.

For retardation that arises during the curving processes, the aromatic polycarbonate sheet that is used as a protective layer subjected to pre-extruding to make an aromatic polycarbonate sheet with invisible interference fringes in coloration as a result of the large retardation (hereafter referred to as a "stretched polycarbonate polarizing sheet") was known (Reference 1). Among various polarizing sheets, this sheet is used for articles that require an excellent appearance or that need to be very eye-friendly.

Further, to produce lenses that have higher impact resistance than that of the polarizing lens obtained by curving the stretched polycarbonate lens or to produce lenses for correction that have focus refractivity, a polarizing lens that is obtained by curving the stretched polycarbonate polarizing sheet to form a spherical or aspherical surface, inserting the curved polarizing sheet into a mold, and injecting an aromatic polycarbonate into the mold to produce the lens (hereafter, "aromatic polycarbonate polarizing lens") is known (References 2 and 3).

The aromatic polycarbonate polarizing lens is made by injecting an aromatic polycarbonate into a mold to fill the aromatic polycarbonate [in the concave surface of the curved aromatic polycarbonate sheet]. This brings about a benefit wherein the unevenness of the thickness of the stretched polycarbonate sheet that is inserted in the mold disappears. Thus, even for lenses without focus refractivity, the aromatic polycarbonate polarizing lens is used in products that require particularly excellent impact resistance or appearance or that need to be very eye-friendly.

In lenses such as aromatic polycarbonate polarizing lenses, which are obtained by inserting thermosetting resins or thermoplastic resins into molds, the shape and thickness of the molded lenses can be freely set by setting the shape of the surface of both sides of the mold and the distance between the two sides accordingly. Thus, based on the optical design, the shape and the distance between the two sides of the mold can be set so as to have the desired values of focus refractivity, prism-diopter, and image distortion.

The surface shape of the molded lens and the surface shape of the mold at the time of contact with the molded lens are generally identical. However, if a very high level of precision of the surface shape of the lens is required, to compensate for a reduction in the thickness of the lens or a change in the surface shape, which are caused by shrinking of the volume when thermosetting resins or thermoplastic resins that are injected into molds solidify, the surface shape and the distance between the two sides of the mold should be adjusted accordingly.

The surface of the aromatic polycarbonate polarizing lens that is produced in this way is subjected to further appropriate steps, such as forming a hard coat layer or an anti-reflection film, etc., and then polishing the rims of the lens, drilling, screw fastening, etc., to fix the lens to the frame, thereby making sunglasses and goggles.

In the polarizing lens obtained by applying curving processes to the aromatic polycarbonate polarizing sheet to form a spherical or an aspherical surface or the injecting polarizing lens obtained by injecting aromatic polycarbonate, for the purpose of reducing the glare of the surface of glass, the surface of water, etc., polarized light in the horizontal direction is cut. In addition, for the purpose of improving visibility or design, for example, an aromatic polycarbonate polarizing sheet colored in grey, brown, or the like, is used to provide a desired color tone and transmittance.

In order to increase the degree of polarization of a polarizing lens, the amount of dichroic dye for dyeing a polyvinyl alcohol film is adjusted to a concentration at which the polarization component in the horizontal direction of light incident on the polarizing lens is almost absorbed. And when the amount of the dichroic dye for dyeing the polyvinyl alcohol film is further increased, the polarization component in the perpendicular direction of light incident on the polarizing lens is also absorbed in a large amount. For a higher performing polarizing lens, a polarizing lens that shows decreased absorbance of the polarization component in the perpendicular direction of light incident in the polarizing lens, by using a dichroic dye that shows a higher dichroic ratio, is required.

Further, regarding the dichroic dyes for dyeing the polyvinyl alcohol film, not a single color, but several colors of dichroic dyes are used. In this regard, by changing the amount of each dichroic dye for dyeing the polyvinyl alcohol film, a polarizing lens having a desired color tone and transmittance can be obtained.

Further, a method to obtain a polarizing lens that has a desired color tone or a desired transmittance by dissolving the dyes in an adhesive layer or an aromatic polycarbonate sheet can be used. The method can control the color tone or the transmittance of an injecting polarizing sheet by itself or in combination with the steps explained above.

In a liquid crystalline material for a projection television that uses a polarizing film and color filters, a method for producing a color filter that has a polarizing function and specific absorption function of wavelengths using dichroic dyes and dyes that have low dichroic ratios was known. (Reference 4)

PRIOR ART DOCUMENTS

Patent Documents

Patent Document 1: Japanese Laid-Open Patent Publication No. H03-39903
Patent Document 2: Japanese Laid-Open Patent Publication No. H08-52817
Patent Document 3: Japanese Laid-Open Patent Publication No. H08-313701
Patent Document 4: Japanese Laid-Open Patent Publication No. H06-242318

SUMMARY OF THE INVENTION

Problems to be Solved by the Invention

The problem to be solved by the present invention is providing a polarizing film for sunglasses that shows desired total light transmittance and desired degree of polarization and little changes in color tone and transmittance. The polarizing film has a color that can be more freely selected. Generally, a polarizing film that has high total transmittance and a high degree of polarization is known as a sophisticated polarizing lens. To produce such a lens, it is necessary to use a combination of dyes that have high dichroic ratios and to keep the degradation of the dyes as small as possible. Form this point, the use of such lenses that show high transmittance and high degree of polarization are limited to articles that do not apply a heat-curving process that brings about degradation of dyes or that apply two dimensional curving or three dimensional curving having a small curve.

A polarizing sheet for sunglasses generally shows a total light transmittance of 10-25% and a degree of polarization of 99% or more. Further, various colored articles are required. To provide such articles, as described above, a method for using various amounts of dichroic organic dyes to obtain polarizing lenses that have desired color tones and desired transmittances was used. In this method, depending on the dichroic organic dyes to be used, the scopes of the colors of the polarizing sheet are restricted. Further, there is a problem where color changes at processing steps such as a curving process to make a spherical and aspherical surface and at an injection process of transparent resin to the concave surface of the curved sheet are relatively large.

Further, as described above, the polarizing lenses that have superior impact resistance, superior outer appearance and reduced eyestrain are obtained by curving an aromatic polycarbonate polarizing sheet to make a spherical or aspherical curve and/or inserting the curved polarizing sheet to a mold and injecting an aromatic polycarbonate to the sheet.

However, in the case of a polarizing lens obtained by subjecting an aromatic polycarbonate polarizing sheet to a curving process to provide a spherical or aspherical shape or an aromatic polycarbonate polarizing lens obtained by an additional injection-molding, there is a problem where the color tone and the transmittance of the aromatic polycarbonate polarizing sheet are significantly changed, resulting in a significant difference between the qualities of the products.

It has been found in studies by the inventors that under conditions in which a good injecting polarizing lens can be obtained, the color tone and transmittance of the injecting polarizing lens are not substantially changed at the process for injecting a transparent resin to produce a polarizing lens. Thus, it is found that the color change occurs during a curving process to curve the polarizing sheet to form a spherical or aspherical surface.

In particular, there is a problem that in the case of an aromatic polycarbonate polarizing lens having a high dye concentration and a low transmittance, the color tone and transmittance of the aromatic polycarbonate polarizing sheet after molding are significantly changed compared to an aromatic polycarbonate polarizing lens having a low dye concentration and a high transmittance.

In addition, there is a problem that when there is a significant change between color tone and transmittance before and after a curving process, the variations of the color tone and the transmittance of the finished products are not constant, resulting in differences between those molded products.

In the case of the color filter in Reference 4, absorbance functions at specific wavelengths are given in order to shield them. Thus, the filter is just used to absorb a specific wavelength at a specific amount and is not used to control transmittance and color tone. Thus, the problem described above should not be considered.

Means for Solving the Problems

The present invention is a method for producing a colored polarizing film of a desired color, wherein the method for producing the polarizing film comprises swelling a polyvinyl alcohol film with water, uniaxially stretching it, dyeing it with a dichroic organic dye, and drying it, wherein the dichroic organic dye comprises a dichroic organic dye composition and a coloration organic dye composition, wherein the dichroic organic dye composition comprises a combination of dichroic organic dyes having a dichroic ratio of 13 or higher, used in an amount to keep the degree of polarization at 90% or more, and wherein the coloration organic dye composition comprises a combination of dyes having an extremely low dichroic ratio of 4 or less or substantially having no dichroic ratio, used in an amount yielding a desired dyed color.

In the present invention, preferably the dichroic organic dye composition and the coloration organic dye composition are used in an aqueous solution. Further, the dichroic organic dye composition is used in an amount to obtain the lower limit of the required dichroic ratio.

Further, in the present invention, preferably the coloration organic dye composition is used in an amount such that the transmittance [of the film] is 10% or more and is at least 5% smaller than the transmittance of a polarizing film obtained by using the dichroic organic dye composition only.

A further embodiment of the present invention is a colored polarizing sheet that comprises a polarizing film produced by swelling a polyvinyl alcohol film with water, uniaxially stretching it, dyeing it with a dichroic organic dye, and drying it, and transparent sheets attached on both sides of the polarizing film by an adhesive, wherein the dichroic organic dye used in producing the film comprises a dichroic organic dye composition and a coloration organic dye composition, wherein the dichroic organic dye composition comprises a combination of organic dyes having a dichroic ratio of 13 or higher, used in an amount to keep the degree of polarization at 90% or more, and wherein the coloration organic dye composition comprises a combination of dyes having an extremely low dichroic ratio of 4 or less or substantially having no dichroic ratio, used in an amount yielding a desired dyed color.

In the present invention, preferably the dichroic organic dye composition and the coloration organic dye composition are used in an aqueous solution. Further, the dichroic organic dye composition is used in an amount to obtain the lower limit of the required dichroic ratio.

Further, in the present invention, preferably the coloration organic dye composition is used in an amount such that the transmittance of the film is 10% or more and is at least 5% smaller than that the transmittance of a polarizing film obtained by using the dichroic organic dyeing composition only.

Further, in the present invention, preferably the resin of the transparent plastic sheet is one or more selected from the group consisting of: aromatic polycarbonates, polyacrylate, acetylcellulose, polyamide, and a composition of an aromatic polycarbonate and alicyclic polyester.

Further, in the present invention, preferably the transparent plastic sheet is an aromatic polycarbonate sheet that has a thickness of from 0.1 mm to 1 mm at 3000 nm or higher double refraction.

Further, in the present invention, preferably the adhesive agent in the adhesive layer is a two-liquid type thermosetting polyurethane resin that consists of a curative agent that comprises a polyurethane prepolymer and a hydroxyl (poly) acrylate.

A further embodiment of the present invention is a colored polarizing lens obtained by laminating with a transparent plastic sheet via an adhesive layer to each surface of a polarizing film that is made by swelling a polyvinyl alcohol resin with water, uniaxially stretching it, dyeing it with a dichroic organic dye, and drying it to obtain a polarizing sheet; curving the polarizing sheet so as to impart spherical or aspherical surfaces thereto to obtain a curved polarizing lens or curving the polarizing sheet so as to impart spherical or aspherical surfaces thereto and injecting a transparent resin onto the concave surface to obtain an injection-molded lens, wherein the transparent resin is an aromatic polycarbonate, wherein the surface of the one side of the polarizing sheet is an aromatic polycarbonate and that side is curved to make a concave surface, wherein the dichroic organic dye is made by using a dichroic organic dye composition and a coloration organic composition, wherein the dichroic organic dye composition used to produce the polarizing film comprises a combination of dichroic organic dyes having a dichroic ratio of 13 or higher and is used in an amount to keep the degree of polarization at 90% or more, and wherein the coloration organic dye composition comprises a combination of dyes having an extremely low dichroic ratio of 4 or less or substantially having no dichroic ratio, and wherein the polarizing film is a polarizing film of the desired color.

In the embodiment, preferably the polarizing film is dyed by using the dichroic organic dye composition and the coloration organic dye composition in an aqueous solution.

Further, the organic dichroic dye composition is used in an amount to obtain the lower-limit of the required dichroic ratio.

In the present invention, preferably the coloration organic dye composition is used in an amount so that the transmittance of the film is 10% or more and is at least 5% smaller than the transmittance obtained by using the dichroic organic dyeing composition only.

In the present invention, preferably the resin of the transparent plastic sheet is one or more selected from the group consisting of: aromatic polycarbonates, polyacrylate, acetylcellulose, polyamide, and a composition of an aromatic polycarbonate and alicyclic polyester.

In the present invention, preferably the aromatic polycarbonate sheet has a thickness of from 0.1 mm to 1 mm at 3000 nm or higher double refraction.

In the present invention, preferably the adhesive agent in the adhesive layer is a two-liquid type thermosetting polyurethane resin that consists of a curative agent that comprises a polyurethane polymer and a hydroxyl (poly) acrylate.

A further embodiment of the present invention is a method for producing a colored polarizing lens consisting of: laminating with a transparent plastic sheet through an adhesive layer to each surface of a polarizing film that is made by swelling a polyvinyl alcohol resin with water, uniaxially stretching it, dyeing it with a dichroic organic dye, and drying it to obtain a polarizing sheet; curving the polarizing sheet so as to impart spherical or aspherical surfaces thereto to obtain a curved polarizing lens or curving the polarizing sheet so as to impart spherical or aspherical surfaces thereto and injecting a transparent resin onto the concave surface of the curved polarizing sheet to obtain an injection-molded lens; wherein the transparent resin is an aromatic polycarbonate, wherein the surface of the one side of the polarizing sheet is an aromatic polycarbonate and that side is curved to make the concave surface, wherein the dichroic organic dye is made by using a dichroic organic dye composition and a coloration organic composition, wherein the dichroic organic dye comprises a dichroic organic dye composition and an coloration organic dye composition, wherein the dichroic organic dye composition comprises a combination of organic dyes having a dichroic ratio of 13 or higher, used in an amount to keep the degree of polarization at 90% or more, and wherein the coloration organic dye composition comprises a combination of dyes having an extremely low dichroic ratio of 4 or less or substantially having no dichroic ratio, wherein the coloration polarized film is the desired color and is obtained by using a coloration organic dye composition in an amount yielding the desired color.

In the present invention, preferably the polarizing sheet is dyed by using the dichroic organic dye composition and the coloration organic dye composition in an aqueous solution. Further, the organic dichroic dye composition is used in an amount to obtain the lower limit of the dichroic ratio to be required.

In the present invention, preferably the coloration organic dye composition is used in an amount such that the transmittance [of the film] is 10% or more and is at least 5% smaller than the transmittance of a polarizing film obtained by using the dichroic organic dyeing composition only.

In the present invention, preferably the resin of the transparent plastic sheet is one or more selected from the group consisting of: aromatic polycarbonates, polyacrylate, acetylcellulose, polyamide, and a composition of an aromatic polycarbonate and alicyclic polyester.

In the present invention, preferably the aromatic polycarbonate sheet has a thickness of from 0.1 mm to 1 mm at 3000 nm or higher double refraction.

In the present invention, preferably the adhesive agent in the adhesive layer is a two-liquid type thermosetting polyurethane resin that consists of a curative agent that comprises a polyurethane polymer and a hydroxyl (poly) acrylate.

Effects of Inventions

The present invention can produce the colored polarizing film that can be more widely selected its color and that shows smaller changes in the color at a molding process, in particular a heat-curving process. Further, since the present invention can provide such a colored polarizing film, colored polarizing sheet and colored polarizing lens that can be more widely selected their colors and that show smaller changes in the color at a molding process, in particular a heat-curving process are provided.

Means for Solving the Problems

Below, the technical features of the present invention are explained.

A resin film, which is as a base material for a polarizing film, is swollen in water and then immersed in a dyeing solution containing the dichroic organic dyes of the present invention while being directionally stretched to disperse the dichroic dye in the base resin in an oriented state, thereby obtaining a polarizing film to which polarization properties have been imparted.

As the base material for the polarizing film to be used in this case, polyvinyl alcohols may be used. As polyvinyl alcohols, polyvinyl alcohol (hereinafter referred to as "PVA"), PVA in which a slight amount of the acetic acid ester structure remains, and PVA derivatives, or polyvinyl formal, polyvinyl acetal, saponified ethylene-vinyl acetate copolymer, etc., which are analogs of the PVA, are preferred, and PVA is particularly preferred.

Further, regarding the molecular weight of a PVA film, from the viewpoint of stretchability and film strength, the weight-average molecular weight is preferably 50,000 to 350,000, and particularly preferably 100,000 to 300,000. A molecular weight of 150,000 or more is particularly preferred. The scaling factor of stretching of the PVA film is preferably 2 to 8 times, and particularly preferably 3 to 6.5 times from the viewpoint of the dichroic ratio and film strength after stretching. 3.5 to 4.5 times is particularly preferred. The thickness of the PVA film after stretching is not particularly limited. However, to handle without any unification with protection films, the thickness of the film is preferably about 20 to 50 μm.

A typical manufacturing process in the case of using PVA as a base film is as follows:
(1) Washing PVA with water to remove impurities while swelling it with water,
(2) Stretching,
(3) Dyeing it in a dyeing tank,
(4) Forming bridges and chelation by using boric acid or a metal compound,
(5) Drying.

Steps (2), (3) (and optionally (4)), can be carried out sequentially or they can be carried out at the same time.

First, in the swelling and washing of step (1), by absorbing water, a PVA film that is easily broken in the dry state is uniformly softened to be stretchable at room temperature. Further, in this step, water-soluble plasticizers used in the manufacturing process of the PVA film are removed or optionally additives are preliminarily adsorbed. At this point, the PVA film is not uniformly and sequentially swollen and a variation in the degree of the swelling occurs. Even in this state, it is important to uniformly apply as small a force as possible to make uniform elongation and to avoid forming wrinkles. Further, in this step, it is most desirable that swelling simply be uniform, and excessive stretching should be minimized, since such stretching causes unevenness of the film.

In step (2), generally stretching is carried out so as to have a draw ratio of 2 to 8 times. In the present inventions, maintaining good processability is important. Thus, the draw ratio of stretching of the PVA film should be selected from 3 to 6 times, preferably from 3.5 to 4.5 times. Further, at this time preferably the orientation of the PVA film is maintained. The orientation relaxation of the PVA film in a stretch orientation state is advanced the longer it is in water and the longer the start of the drying step is prolonged. Thus, from the viewpoint of maintaining good properties, the time during stretching should be designed so as to be as short as possible. Further, after stretching excess water should be removed as soon as possible. In other words, it is preferable that the PVA film be immediately introduced into the drying step to dry it without excess heat load. The draw ratio of the present invention is based on the raw film of the polyvinyl alcohol resin.

The dyeing of step (3) is accomplished by absorption or deposition of dyes to polymer chains of oriented polyvinyl alcohol film. From this mechanism, this step can be carried out before, at the same time as, or after the step for uniaxial stretching without a large variation. Since the interface is a surface with high restriction that can be easily oriented, it is preferable to select conditions that use this property. The temperature of step (3) is generally selected from 40-80° C. because of the requirement of high productivity. In the present invention, it is generally selected from 25-48° C., preferably 30-40° C., particularly 30-35° C.

Step (4) is carried out to improve resistance to heat, water, or organic solvents. Treatment with boric acid increases thermostability by forming cross bridges among PVA chains. This step can be carried out before, at the same time as, or after uniaxial stretching of the polyvinyl alcohol film without a large variation. Further, the latter, the metal compound, is used to form chelate compounds with dye molecules to stabilize. Generally, this step is carried out at or after the dyeing step.

As the metal compound, transition metals belonging to Period 4, Period 5 and Period 6 may be used. Among such metal compounds, those whose effects of heat resistance and solvent resistance have been confirmed to exist, but from the viewpoint of cost, metal salts such as acetates, nitrates and sulfates of fourth-period transition metals such as chromium, manganese, cobalt, nickel, copper and zinc are preferred. Among them, compounds of nickel, manganese, cobalt, zinc and copper are more preferred because they are inexpensive and excellent in the aforementioned effects. More specific examples thereof include manganese (II) acetate tetrahydrate, manganese (III) acetate dihydrate, manganese (II) nitrate hexahydrate, manganese (II) sulfate pentahydrate, cobalt (II) acetate tetrahydrate, cobalt (II) nitrate hexahydrate, cobalt (II) sulfate heptahydrate, nickel (II) acetate tetrahydrate, nickel (II) nitrate hexahydrate, nickel (II) sulfate hexahydrate, zinc (II) acetate, zinc (II) sulfate, chromium (III) nitrate nonahydrate, copper (II) acetate monohydrate, copper (II) nitrate trihydrate and copper (II)

sulfate pentahydrate. Any one of these metals may be used solely, and alternatively, a plurality of types of compounds may be used in combination.

Regarding the content of the metal compound and boric acid in the polarizing film, from the viewpoint of imparting heat resistance and solvent resistance to the polarizing film, the metal content of the metal compound is preferably 0.2 to 20 mg, and more preferably 1 to 5 mg, per 1 g of the polarizing film. The boron content of the boric acid is preferably 0.3 to 30 mg, and more preferably 0.5 to 10 mg. The composition of the treatment solution to be used for the treatment is set so as to satisfy the above-described content. In general, it is preferred that the concentration of the metal compound is from 0.5 to 30 g/L and that the concentration of boric acid is from 2 to 20 g/L. Analysis of the content of metal and boron in the polarizing film can be conducted using atomic absorption spectrometry.

Generally, the immersion temperature to be used is the same as the temperature of the dyeing step. The immersion temperature is preferably 20 to 70° C., and more preferably 20 to 45° C., more preferably 30 to 40° C., particularly preferably 30 to 35° C. Further, the immersion time in the step is selected from 0.5 to 15 minutes.

In Step (5), the PVA film, which was already stretched, dyed, and suitably treated with boric acid or metal compounds, is dried. The PVA film has a heat resistance that depends on its moisture content. Thus, if the temperature increases when PVA film has a high moisture content, its uniaxal condition gets out of order, in a shorter period. Therefore, the dichroic ratio of the PVA film is decreased. Since the PVA film is dried from its surface, preferably it is dried from both surfaces. This step is preferably carried out by ventilation with dry air while removing vapor. Further, as is well known in the art, to prevent excess heating a method where evaporated moisture is immediately removed to accelerate evaporation is preferred. Such a method can dry the PVA film while suppressing a temperature increase. The temperature of the dry air is from the temperature that can substantially maintain the color of a dried film to generally 70° C. or higher, preferably at a temperature of 90 to 120° C. for 1 to 120 minutes, preferably for 3 to 40 minutes.

A polarizing PVA film for sunglasses is generally produced by the steps explained above.

In the present invention, step (3) uses:
(3-1) a dichroic organic dye composition that comprises a combination of dichroic organic dyes having a dichroic ratio of 10 or higher, used in an amount to keep the degree of polarization at 90% or more, and
(3-2) a coloration organic dye composition that comprises a combination of dyes having an extremely low dichroic ratio of 4 or less or substantially having no dichroic ratio, used in an amount yielding a desired dyed color, and
(3-3) both compositions are used to dye to produce the polarizing film of the present invention.

To obtain the desired degree of polarization and desired transmittance, the amount of the dichroic organic dye composition of (3-1) is selected such that the desired degree of polarization is obtained. The coloration organic dye composition of (3-2) is used in an amount to provide transmittance of 40% to 8% and at least 5% smaller than the transmittance of a polarizing film obtained by using the dichroic organic dye composition only.

Since the dichroic organic dye composition is used together with the coloration organic dye composition to dye the polarizing film of the present invention, the transmittance of the PVA polarizing film dyed by the dichroic organic dye composition makes an upper limit of the transmittance of the PVA polarizing film and the transmittance of the PVA polarizing film died by the coloration organic dye composition makes the lower limit of the transmittance of the PVA polarizing film. This brings about wide selectively in the transmittance. Further, the color tone is controlled by the amount of the coloration organic dye composition. Thus, in the present invention, a wide range of the color tone can be obtained according to the ratio of the amounts used of both compositions without considering the change in the degree of polarization.

One embodiment to obtain the amounts to be used of the compositions that impart desired physical property values is:
(1) determining the physical property value of the PVA polarizing film dyed by each of the dichroic organic dyes and the physical property value of the PVA polarizing film dyed by each of the coloration organic dyes;
(2) calculating the amount of the dichroic organic dye composition and the coloration organic dye composition to be used to provide the desired physical property value without considering the synergistic effect brought about by the dichroic organic dye composition and the coloration organic dye composition in a simultaneous stain (hereafter "calculated value 1");
(3) producing a polarizing film in an aqueous solution that contains both compositions in an amount based on calculated value 1 to determine the physical property value of the obtained film (hereafter "physical property value 1");
(4) comparing physical property value 1 to the desired physical property value and readjusting calculated value 1 to obtain the desired physical property value (hereafter "calculated value 2");
(5) producing a polarizing film in an aqueous solution that contains both compositions in an amount based on calculated value 2 to determine the physical property value of the obtained film (hereafter "physical property value 2");
(6) comparing physical property value 2 to the desired physical property value;
(7) if physical property value 2 does not reach the desired physical property value, the adjustment of further calculated values, production of polarizing films, and determination of further physical property values are repeated accordingly.

When the Lambert-Beer formula is established, physical property values of dyes i.e., their dichroic ratios and concentrations and amounts of them to dye the film specify the physical property values of polarizing films to be made i.e., total light transmittances and degree of polarization. On the other hand, if the physical property values of the polarizing films are specified, the dichroic ratios and the concentrations of dyes to be used are also specified. In the present invention, in (3-1), when one specifies the required degree of polarization, the dichroic organic dye composition is selected so that the produced film shows higher total light transmittance than the required total light transmittance. Next, in (3-2), complementary colors are absorbed by using the coloration organic dye composition to adjust the transmittance and to dye the film to desired colors. For example, if one (skilled in the art) produces a polarizing film that has a degree of polarization of 90% and a transmittance of 20%, in (3-1), the dichroic ratio of 13, a degree of polarization of 99% and a transmittance of 29% are selected. Then in (3-2), by using the coloration organic dye composition in an amount to obtain the degree of polarization of 99% and to reduce the transmittance of 29% to 20%, the complementary color is absorbed.

Among the dyes for which dichroic ratios have been estimated according a method described below, exemplary azo dyes having dichroic ratios of 13 or more are listed in but are not limited to the following. The azo dyes are denoted by their trade names. Color Index Generic Names, where known, are in parentheses.
SUMILIGHT SUPRA YELLOW BC CONC (C.I.Direct Yellow28)
KAYARUS LIGHT YELLOW F8G (C.I.Direct Yellow87)
KAYACELON YELLOW C-2RL (C.I.Direct Yellow164)
DIRECT FAST ORANGE S (C.I.Direct Orange26)
SUMILIGHT SUPRA ORANGE 2GL 125% (C.I.Direct Orange39)
NIPPON FAST SCARLET GSX (C.I.Direct Red4)
FAST SCARLET 4BS (C.I.Direct Red23)
SUMILIGHT RED 4B (C.I.Direct Red81)
KAYARUS SUPRA BLUE BWL 143 (C.I.Direct Blue237)
KAYARUS SUPRA BROWN GL 125 (C.I.Direct Brown195)
KAYARUS SUPRA BROWN B2R (C.I.Direct Brown209)
KAYARUS SUPRA BROWN GTL (C.I.Direct Brown210)

In the points of stainability and heat resistance, direct dyes that comprise azo dyes that have a sulfonate group are preferable. By combining three or more of the azo dyes, the direct dyes are resolved or dispersed in a stain solution in an amount such that the polarizing film is stained at a desired color tone (in the present invention, the color tone is substantially colorless) and a desired transmittance. Inorganic salts, such as sodium sulfate, as a dyeing aid are suitably added to the stain solution.

Among the dyes for which dichroic ratios have been estimated according a method described below, exemplary dyes having an extremely low dichroic ratio of 4 or less or substantially having no dichroic ratio are listed in but are not limited to the following. The azo dyes are denoted by their trade names. Color Index Generic Names, where known, are in parentheses.
DIRECT BRILLIANT PINK B (C.I.Direct Red9)
KAYARUS LIGHT RED F5G (C.I.Direct Red225)
DIRECT LIGHT ROSE FR (C.I.Direct Red227)
SUMILIGHT SUPRA TURQUOISE BLUE G (C.I.Direct Blue86)
DIRECT SUPRA BLUE FFRL (C.I.Direct Blue108)
KAYARUS CUPRO GREEN G (C.I.Direct Green59)
DIRECT FAST BLACK B (C.I.Direct Black22)
SUNCHROMINE YELLOW MR(C.I.Mordant Yellow3)
CHROME YELLOW AS (C.I.Mordant Yellow5)
CHROME YELLOW 3R (C.I.Mordant Yellow8)
CHROME YELLOW PG (C.I.Mordant Yellow23)
CHROME ORANGE FL (C.I.Mordant Orange29)
CHROME RED B CONC. (C.I.Mordant Red7)
CHROME RED 5G (C.I.Mordant Red19)
SUNCHROMINE BRILLIANT VIOLET R CONC. (C.I.Mordant Violet1:1)
CHROME FINE VIOLET R (C.I.Mordant Violet1)
CHROME CYANINE BXS (C.I.Mordant Blue1)
MORDANT BLUE B 120% (C.I.Mordant Blue13)
CHROME CYANINE BLA (C.I.Mordant Blue29)
MORDANT GREEN L (C.I.Mordant Green17)
CHROME GREEN 3B-N (C.I.Mordant Green28)
MORDANT BROWN KS (C.I.Mordant Brown15)
CHROME BROWN LE (C.I.Mordant Brown19)
CHROME BROWN RH (C.I.Mordant Brown33)
CHROME BLACK P2B (C.I.Mordant Black7)
CHROME BLACK PLW (C.I.Mordant Black9)
CHROME BLACK ET-1 (C.I.Mordant Black11)
CHROME NAVY CR 158% (C.I.Mordant Black17)
CHROME LIGHT GREY G (C.I.Mordant Black38)
CHROME BORDEAUX FB
ALIZARINE CHROME BRILLIANT BLUE BL
CHROME BLUE 2G
SUMIFIX YELLOW GR 150% (C.I Reactive Yellow15)
LANASOL YELLOW 4G (C.I Reactive Yellow39)
SUMIFIX GOLDEN YELLOW GG (A) 150% (C.I Reactive Yellow76)
KAYACION YELLOW E-S4R (C.I Reactive Yellow84)
NOVACRON YELLOW P-6GS GRAN(C.I Reactive Yellow95)
KAYACION YELLOW E-SNA (C.I Reactive Yellow102)
KAYACION YELLOW E-SN4G (C.I Reactive Yellow105)
DRIMARENE YELLOW K-2R CDG (C.I Reactive Yellow125)
SUMIFIX SUPRA YELLOW 3RF 150% GRAN (C.I Reactive Yellow145)
SUMIFIX SUPRA BRILLIANT YELLOW 3GF 150% GR (C.I Reactive Yellow167)
NOVACRON YELLOW C-R (C.I Reactive Yellow168)
NOVCRON YELLOW C-5G (C.I Reactive Yellow175)
KAYACION YELLOW CF-3RJ 150
KAYACION YELLOW E-CM
PROCION ORANGE PX-RN (C.I.Reactive Orange5)
REMAZOL BRILLIANT ORANGE 3R SPECIAL (C.I.Reactive Orange16)
LEVAFIX YELLOW E-3RL GRAN (C.I.Reactive Orange30)
LEVAFIX ORANGE E-3GA GRAN(C.I.Reactive Orange64)
REMAZOL GOLDEN YELLOW RNL GRAN 150% (C.I.Reactive Orange107)
DRIMAREN RUBINOL X3LR CDG (C.I.Reactive Red55)
BRILLIANT RED G SPL (C.I.Reactive Red112)
BRILLIANT RED 7BF LIQ 25% (C.I.Reactive Red114)
LANASOL RED 2G (C.I.Reactive Red116)
LEVAFIX SCARLET E-2GA GRAN (C.I.Reactive Red124)
LEVAFIX BRILLIANT RED E-4BA GRAN (C.I.Reactive Red158)
LEVAFIX BRILLIANT RED E-6BA GRAN (C.I.Reactive Red159)
REMAZOL BRILLIANT RED F3B GRAN (C.I.Reactive Red180)
SUPRA BRILLIANT RED 3BF 150% GRAN (C.I.Reactive Red195)
REMAZOL RED RB 133% (C.I.Reactive Red198)
SUPRA SCARLET 2GF 150G (C.I.Reactive Red222)
NOVACRON RED P-6B GRAN. 150%
NOVACRON RED C-2G
KAYACION VIOLET A-3R (C.I.Reactive Violet1)
REMAZOL BRILL. VIOLET 5R (C.I.Reactive Violet5)
DRIMAREN VIOLET K-2RL CDG (C.I.Reactive Violet33)
REMAZOL BRILL. BLUE RN (C.I.Reactive Blue19)
SUMIFIX TURQUOISE BLUE G (N) CONC. (C.I.Reactive Blue21)
NOVACRON BLUE P-3R IN (C.I.Reactive Blue49)
LANASOL BLUE 3R (C.I.Reactive Blue50)
DRIMARENE BLUE X-3LR CDG (C.I.Reactive Blue52)
LANASOL BLUE 3G (C.I.Reactive Blue69)
NOVACRON TURQUOISE P-GR 150% (C.I.Reactive Blue72)
DRIMARENE NAVY X-RBL CDG (C.I.Reactive Blue79)
LANASOL BLUE 8G-01 150% (C.I.Reactive Blue185)
DRIMARENE BLUE K-2RL CDG (C.I.Reactive Blue209)
SUMIFIX SUPRA BLUE BRF 150% GRAN. (C.I.Reactive Blue221)
SUMIFIX SUPRA NAVY BLUE BF GRAN. (C.I.Reactive Blue222)

SUMIFIX SUPRA TURQUOISE BLUE BGF (N)(C.I.Reactive Blue231)
NOVACRON BLUE C-R (C.I.Reactive Blue235)
KAYACION BLUE CF-GJ 150
KAYACION BLUE CF-BL
KAYACIN MARINE E-CM
KAYACION NAVY E-CM
SUMIFIX SUPRA NAVY BLUE 3GF 150% GRAN
LEVAFIX BROWN E-2R GRAN(C.I.Reactive Brown19)
NOVACRON BROWN P-6R GRAN. 150
REMAZOL BLACK B-N 150% (C.I.Reactive Black5)
REMAZOL BLACK RL 133% (C.I.Reactive Black31)
REMAZOL DEEP BLACK N 150% (C.I.Reactive Black31)
ACID QUINOLINE YELLOW WS H/C (C.I.Acid Yellow3)
KAYACYL YELLOW GG 80 (C.I.Acid Yellow17)
TARTRAZINE NS CONC(C.I.Acid Yellow23)
SUMINOL FAST YELLOW R CONC. (C.I.Acid Yellow25)
KAYANOL MILLING YELLOW O (C.I.Acid Yellow38)
SUMINOL MILLING YELLOW MR (C.I.Acid Yellow42)
AMINYL YELLOW E-3GL (C.I.Acid Yellow49)
SUMINOL FAST YELLOW G (B) (C.I.Acid Yellow61)
ERIONYL YELLOW B-4G (C.I.Acid Yellow79)
KAYANOL YELLOW N5G (C.I.Acid Yellow110)
LANYL YELLOW G EX CC (C.I.Acid Yellow116)
KAYAKALAN YELLOW GL 143 (C.I.Acid Yellow121)
KAYANOL MILLING YELLOW 5GW (C.I.Acid Yellow127)
LANACRON YELLOW N-2GL KWL (C.I.Acid Yellow129)
ERIONYL GOLDEN YELLOW M-R-02 (C.I.Acid Yellow151)
TECTILON YELLOW 2G 200% (C.I.Acid Yellow169)
LANACRON YELLOW S-2G-01 KWL (C.I.Acid Yellow220)
TELON YELLOW RLN MICRO (C.I.Acid Yellow230)
TECTILON YELLOW 3R 200% (C.I.Acid Yellow246)
CHUGANOL FAST YELLOW 5GL (C.I.Acid Yellow40:1)
SOLAR ORANGE (C.I.Acid Orange7)
SOLAR LIGHT ORANGE GX (C.I.Acid Orange10)
CHUGANOL MILLING BROWN 5R (C.I.Acid Orange51)
CHUGANOL MILLING ORANGESG (C.I.Acid Orange56)
KAYANOL YELLOW N3R (C.I.Acid Orange67)
AMINYL YELLOW E-3RL (C.I.Acid Orange67)
LANYL ORANGE R 200% (C.I.Acid Orange88)
CHUGANOL MILLING ORANGE GSN 150% (C.I.Acid Orange95)
SUMINOL MILLING ORANGE GN (N)(C.I.Acid Orange95)
ISOLAN ORANGE K-RLS (C.I.Acid Orange107)
TELON ORANGE AGT 01 (C.I.Acid Orange116)
LANYL ORANGE 2R E/C (C.I.Acid Orange120)
SUPRALAN ORANGE S-RL (C.I.Acid Orange166)
LANASYN YELLOW M-2RL 180 (C.I.Acid Orange180)
NYLOSAN ORANGE NRL 250 (C.I.Acid Orange250)
LANASYN ORANGE M-RL P
SILK SCARLET (C.I.Acid Red9)
BRILLIANT SCARLET 3R CONC. (C.I.Acid Red18)
ACID RHODAMINE G CONC (C.I.Acid Red50)
ACID RHODAMINE B CONC (C.I.Acid Red52)
CHUGACID RED FCH (C.I.Acid Red73)
CHUGACID RUBINOL 3B 200% (C.I.Acid Red80)
ROCCELINE NS CONC. 120% (C.I.Acid Red88)
CHUGANOL ANTHRACENE RED G (C.I.Acid Red97)
SUMINOL FAST RED G (B) (C.I.Acid Red118)
SUMINOL MILLING BRILLIANT RED 3BN (N) CONC. (C.I.Acid Red131)
LANYL RED GG (C.I.Acid Red211)
LANYL RED B (C.I.Acid Red215)
LANASYN BORDEAUX M-RLA200 (C.I.Acid Red217)
SUMINOL MILLING BRILLIANT RED B CONC. N (C.I.Acid Red249)
AMINYL RED E-3BL (C.I.Acid Red257)
TELON RED M-BL (C.I.Acid Red260)
CHUGAI AMINOL FAST PINK R (C.I.Acid Red289)
NYLOSAN RED N-2RBL SGR (C.I.Acid Red336)
TELON RED FRL MICRO (C.I.Acid Red337)
LANASYN RED M-G (C.I.Acid Red399)
KAYAKALAN RED BL
NYLOSAN RED EBL SGR 180
KAYANOL MILLING RED BW
KAYANOL MILLING VIOLET FBW (C.I.Acid Violet48)
ERIONYL RED B-10B-01 (C.I.Acid Violet54)
CHUGAI AMINOL FAST VIOLET F6R (C.I.Acid Violet102)
ACID PURE BLUE VX (C.I.Acid Blue1)
ACID BRILLIANT BLUE AF-N(C.I.Acid Blue7)
CHUGACID LIGHT BLUE A (C.I.Acid Blue25)
KAYANOL BLUE N2G (C.I.Acid Blue40)
NYLOSAN BLUE E-GL P 250 (C.I.Acid Blue72)
CHUGANOL BLUE 6B 333% (C.I.Acid Blue83)
CHUGANOL BLUE G 333% (C.I.Acid Blue90)
KAYANOL NAVY BLUE R (C.I.Acid Blue92)
SUMINOL MILLING BRILLIANT SKY BLUE SE (N) (C.I.Acid Blue112)
SUMINOL MILLING CYANINE 5R (N) (C.I.Acid Blue113)
KAYANOL MILLING BLUE GW (C.I.Acid Blue127)
LANYL BRILLIANT BLUE G EX CC (C.I.Acid Blue127:1)
KAYANOL BLUE NR (C.I.Acid Blue129)
KAYANOL MILLING BLUE BW (C.I.Acid Blue138)
KAYANOL MILLING BLUE 2RW (C.I.Acid Blue140)
LANYL BLUE 3G EX CONC (C.I.Acid Blue171)
NYLOSAN BLUE N-GL 150 (C.I.Acid Blue230)
TECTILON BLUE 6G 200% (C.I.Acid Blue258)
TELON BLUE AFN (C.I.Acid Blue264)
TECTILON BLUE 4R-01 200% (C.I.Acid Blue277:1)
NYLOSAN B BLUE N-FL SGR180 (C.I.Acid Blue278)
NYLOSAN BLUE N-5GL SGR 200 (C.I.Acid Blue280)
KAYALAX NAVY R (C.I.Acid Blue300)
NYLOSAN BLUE N-BLN (C.I.Acid Blue350)
LANACRON BLUE N-3GL
ACID GREEN V (C.I.Acid Green16)
CHUGANOL CYANINE GREEN G (C.I.Acid Green25)
SUMINOL MILLING BROWN 5R (C.I.Acid Brown51)

The dyes listed above are generally not called dichroic dyes. The dyes (pigments) listed supra that show high dichroic ratios are disclosed various references. Thus, one (skilled in the art) can know the dichroic ratio of the dyes that show high dichroic ratios. However, for the dyes that are used in the coloration organic dye composition, either dichroic ratios have not been used or there was no reason to use dichroic ratios. Thus, the inventors do not find any references to explain the technical meaning of the dyes that show extremely low dichroic ratios. Thus, the dyes listed above, which are publicly known and are not known as dyes showing high dichroic ratio, are used in the coloration organic dye composition and are one example that is proved in the examples below.

The dichroic ratio is the value that is obtained by dyeing the PVA films with these dyes in the method described below. For example, in a case where a degree of polarization of 99% or more is required, the dichroic ratio of the coloration organic dye composition contributes to an increase in the degree of polarization. However, a change derived from such a contribution can be ignored because of the scope of such a high polarization. On the other hand, for example in a lens that requires polarization of about 90%, if the dichroic ratio of the coloration organic dye composition is increased, in the present invention, if the dichroic ratio of the coloration organic dye composition is close to 4, since the polarization film obtained shows a higher degree of polarization than that of the polarization film of interest. This may be a problem. In any case, when the PVA film is dyed, the composition that shows a smaller dichroic ratio is preferable because of the small change in the degree of polarization and the small change in color tone during a heating process.

In the present invention, the dichroic ratios of the dyes that are used in the dichroic organic dye composition and the coloration organic dye composition mean the values measured in the maximum absorption wavelength of a polarizing film produced by using dichroic dyes instead of iodine under the manufacturing conditions where the polarizing film produced by using iodine shows dichroic ratios measured at 600 nm of 60 or more.

Next, a transparent protection sheet that consists of transparent plastic sheet laminated to each surface of the polarizing film produced by the processes above via an adhesive layer to produce a polarizing sheet. The transparent plastic sheet generally has a thickness of 0.1-1 mm. It has a single layer or multiple layers that are obtained by a co-extrusion method. For example, it may be a co-extruded sheet of an aromatic polycarbonate and polyacrylate. Further, in the present invention, the surface that is a concave curve made by a curving process, where resin is injected is preferably an aromatic polycarbonate. Further, generally the polarizing sheet of the present invention (hereafter "the present polarizing sheet") has protection films on both sides. In general, it goes through a punching process to produce lens shaped products. Then, the products undergo a heat-curving process. Then, the protection films of both sides are removed. Then, the products are set in the injection mold and are unified with the injected aromatic polycarbonate to produce injection molding polarizing lenses.

Transparent plastic materials that are used for the present inventions are selected from transparent resins consisting of aromatic polycarbonates, noncrystal polyolefins (alicyclic polyolefins), polyacrylate, polysulfate, acetylcellulose, polystyrene, polyester, polyamide, and a composition of aromatic polycarbonate and alicyclic polyester, and mixtures thereof. Among them, to produce most general polarizing films, acetylcellulose may be required. Because of the properties of the mechanical strength and impact resistance, aromatic polycarbonates are preferable. Because of chemical resistance, polyolefins, polyacrylate, and polyamide are preferable. Because of the dyeability after molding lenses, polyacrylate, and polyamide are preferable.

As a resin material for the aromatic polycarbonate sheet to be used in this case, from the viewpoint of film strength, heat resistance, durability or curving workability, polymers produced according to the well-known method from a bisphenol compound typified by 2,2-bis(4-hydroxyphenyl)alkane or 2,2-(4-hydroxy-3,5-dihalogenophenyl)alkane are preferred, and the polymer skeleton thereof may include a structural unit derived from a fatty acid diol or a structural unit having ester bonds. In particular, an aromatic polycarbonate induced from 2,2-bis(4-hydroxyphenyl)propane is preferred.

Regarding the molecular weight of the aromatic polycarbonate, the viscosity-average molecular weight is preferably 12,000 to 40,000, and the viscosity-average molecular weight is particularly preferably 20,000 to 35,000. Further, the aromatic polycarbonate shows a large photoelastic constant. And colored interference fringe easily occurs based on birefringence derived from stress and orientation. Thus, it is preferable to blind the colored interference fringe by having a high retardation value in advance. Thus, a lower limit of 2,000 nm or higher and an upper limit of 20,000 nm or lower is preferable. The lower limit of 3,000 nm or higher is more preferable. In particular, considering the decrease in the retardation value in processing steps, preferably the lower limit should be 4,000 nm or higher. When the retardation value is higher, a colored interference fringe is not easily generated, but there is a disadvantage in that the surface shape is easily deformed. The aromatic polycarbonate sheet that has a high retardation value can be used on the side where the light enters, i.e., the side opposite the human eye, to prevent colored interference fringe.

Alicyclic polyester resins used as a component of a composition of an aromatic polycarbonate, a sheet or film of the protective layers, and a resin for injection molding to produce lenses, are obtained by well-known methods for example esterification or transesterification of dicarboxylic acid components represented by 1,4-cyclohexane dicarboxylic acid, a diol components represented by 1,4-cyclohexane dimethanol, and minor components if required, followed by a polycondensation reaction that is carried out by suitably adding polymerization catalysts and gradually reducing the pressure of the reactor.

Polyamide resins used in the present invention are those known as polyamide resins for producing lenses. The heat deformation temperature, which is an index for heat resistance, of such polyamide resins is in a range of from 100° C. to 700° C. Specific polyamide resins are aromatic polyamide resins, alicyclic polyamide resins, aliphatic polyamide resins, and copolymers thereof. The alicyclic polyamide resins are preferable in terms of their mechanical strength, chemical resistance, transparency, etc. However, two or more types of polyamide resins can be combined. Exemplary combined polyamide resins are but are not limited to GLILAMID TR FE5577, XE 3805 (EMS), NOV-AMID X21 (Mitsubishi Engineering-Plastics), Toyobo Nylon T-714E (Toyobo).

(Meth)acrylic resins may be homopolymers of each (meth)acrylic ester, such as polymethyl methacrylate (PMMA), methyl methacrylate, or copolymers of PMMA, MMA, and one or more of their monomers, or mixtures of some of these polymers. A (meth)acrylate that has a cyclic alkyl structure is preferable because it has low birefringence, low hygroscopicity, and high heat resistance. Examples of such (meth)acrylic-based resins include ACRYPET (trademark; produced by Mitsubishi Rayon Co., Ltd.), DELPET (trademark; produced by Asahi Kasei Chemicals Corporation), PARAPET (trademark; produced by Kuraray Co., Ltd.), and the like.

An adhesive layer is used for bonding a transparent protective layer and the polarizing film. Usable adhesives include polyvinylalcohol resin-based materials, acrylic resin-based materials, urethane resin-based materials, polyester resin-based materials, melamine resin-based materials, epoxy resin-based materials, silicone resin-based materials, and the like. Specifically from the viewpoint of adhesiveness with aromatic polycarbonates and adhesiveness with the polarizing layer or the photochromic layer, a two-liquid thermosetting urethane resin containing a polyurethane prepolymer, which is a urethane resin-based material, and a curing agent are preferable. The structures of the layers of the polarizing sheet of the present invention are not limited to those explained above. For the adhesive agents that bind the polarizing film and transparent protective layers, polarizing sheets may be used that also have photochromic properties produced by using adhesive agents that are obtained by dissolving photochromic dyes.

The protective layers of the present invention are selected based on producing conditions that do not substantially change the functions of the functional layers under suitable processing conditions. For example, when selective reflection films that consist of polyester-based super multi layers are used together with the transparent protective layers, to make the thickness of a single layer of the super multi layers ¼λ, production and stretching of multi-layer sheets are repeated until it has an optical thickness of interest. (This is the same principal as that for producing cylindrical candy in which a design appears in the cross section wherever it is sliced.) Thus, for processing conditions under which the functions of the protecting layers are maintained, it is necessary to select temperatures and time so that the protection layers do not substantially relax from a stretched state during the processing steps.

Next, the polarizing sheet of the present invention goes through a punching process to produce lens shaped products. Then, the products undergo a curving process. From the viewpoint of the productivity of each lens-shaped product, the process to produce lens shaped products is carried out by using a punching blade that consists of a Thomson blade to punch plural lens-shaped products. The specific shape of each lens-shaped product is selected based on the configuration of the finished product (such as sunglasses, goggles). A typical lens-shaped product is a disk that has an 80 mm diameter or a slit shape that is cut in the same width at both ends in a direction perpendicular to the polarization axis. Further, as explained in the section about the selection of the type of protection sheet of the polarizing sheet of the present invention, the conditions of the curving process are determined based on the conditions where degradation of layers that demonstrate the functionality of the polarizing sheet do not occur substantially.

When the aromatic polycarbonate polarizing sheet is used as an injection molding polarizing lens, in the curving process the sheet is curved along the surface of the mold used for injection molding. In the polarizing sheet of the present invention, when high retardation aromatic polycarbonate sheets are used as protection layers, since the polarizing film is easy to tear along the stretched direction, conditions are selected so as not to make such tears. The temperature of the mold in the curving process of the aromatic polycarbonate polarizing sheet is preferably lower than the glass transition temperature of the aromatic polycarbonate used in the polycarbonate polarizing sheet. Further, preferably, the temperature of the stretched polycarbonate polarizing sheet just before the curving process is controlled by a preheating treatment to be within the range of from a temperature 50° C. less than the glass transition temperature of the aromatic polycarbonate to a temperature less than the glass transition point. In particular, a temperature lower than 40° C. less than the glass transition temperature of the aromatic polycarbonate to a temperature less than 5° C. lower than the glass transition temperature is preferable.

Next, an aromatic polycarbonate is injected into the curved polarizing sheet to produce an induction molding lens. Conditions for injection molding are not particularly limited, but an excellent outer appearance is required. From this point, conditions for injection molding that can obtain molding lenses that have as high a filling ratio as possible, such as filling ratio, injection pressure, holding pressure, weighing, and molding cycle, should be selected. The temperature of the resins is [the melting point of] an aromatic polycarbonate resin and is selected from 260-320° C., accordingly. The molding temperature is preferably a temperature that is equal to or lower than a temperature 100° C. lower than the glass-transition temperature of the aromatic polycarbonate resin and more preferably a temperature that is a temperature 80° C. lower than the glass-transition temperature and lower than a temperature 15° C. lower than the glass-transition temperature. Particularly, a temperature that is a temperature 70° C. lower than the glass-transition temperature and lower than a temperature 25° C. lower than the glass-transition temperature is preferable.

Next, the hard coating treatment may be carried out. The materials for hard coating and the processing conditions are not particularly limited, but an excellent outer appearance and adhesiveness with respect to the aromatic polycarbonate as the base or inorganic layers such as a mirror coat and an antireflection coat to be subsequently applied are required. From this viewpoint, the firing temperature is preferably a temperature that is equal to or higher than a temperature 50° C. lower than the glass-transition temperature of the aromatic polycarbonate used for the stretched polycarbonate polarizing sheet and lower than the glass-transition temperature, and particularly preferably a temperature that is equal to or higher than a temperature 40° C. lower than the glass-transition temperature and lower than a temperature 15° C. lower than the glass-transition temperature, i.e., a temperature around 120° C. The time required for firing the hard coat is about 30 minutes to 2 hours.

EXAMPLES

Producing Colored Polarizing Films

Below, the preferable embodiments in the method for producing the colored polarizing film of the present invention is explained by using Examples 1-6 and Comparative examples 1, 2, and 3.

As shown in Table 1 below, the dichroic organic dye composition and the coloration organic dye composition were prepared.

Examples 2, 4, 5, and 6 of Table 2 are first embodiments for providing polarizing films that have color tones that cannot be obtained by using available dichroic organic dye compositions used in the dyeing process of the conventional polarizing films. Color tones and dichroic ratios are in parentheses after the names of the dyes. The dichroic ratios in the Examples are the values of maximal absorption wavelengths obtained under the conditions to obtain the dichroic ratio of 80 at a wavelength of 600 nm in the polarizing film produced by dyeing it with iodine.

(1) Dichroic Organic Dye Composition

As the dichroic organic dye composition that imparts the degree of polarization to the film, the composition below was used
Dichroic Organic Dye Composition A:
C.I.Direct Blue 237 (blue, 19.9), C.I.Direct Red 81 (red, 22.0), C.I.Direct Orange 39 (yellow, 23.6)
The values in parentheses show the dichroic ratios.
(2) Coloration Organic Dye Composition As coloration organic dye compositions that impart color tones, the compositions listed below were used.
Coloration Organic Dye Composition a:
C.I.Direct Blue 86 (blue1, 1.5), C.I.Direct Red 227 (red, 1.3), C.I.Mordant Yellow 8 (yellow, 1.7)
Coloration Organic Dye Composition b:
Kayacion Blue CF-BL (blue1, 1.3), Novacron Red C-2G (red, 1.4), C.I Reactive Yellow145 (yellow, 2.6)
(3) Producing Polarizing Film Polyvinyl alcohol (Kuraray Co., Ltd., trade name: VF-PS#7500) was swollen in water at 35° C. for 270 seconds while being stretched two-fold.

After that, it was dyed in an aqueous solution containing dye compositions disclosed on Table 1 and 10 g/L of an anhydrous sodium sulfate at 35° C. During this process, it was stretched four-fold. This dyed film was immersed in an aqueous solution containing 2.3 g/L of nickel acetate and 4.4 g/L of boric acid at 35° C. for 120 seconds while being stretched 5.6-fold. The film was dried at room temperature for 3 minutes in a state wherein the tension was retained, and then subjected to a heating treatment at 110° C. for 3 minutes, whereby a polarizing film was obtained. The amounts to be used of the dichroic organic dye composition and the coloration organic dye composition are disclosed in Table 1 below.

Next, the transmittance, color tones, degree of polarization, and colors by visual observation of the obtained polarizing films are shown in Table 2. The degree of polarization was obtained by the following formula:

$$\text{Degree of polarization} = 100 \times (\tau p\max - \tau p\min)/(w\max + \tau p\min),$$

wherein, $\tau p\max$ is the maximum value of luminous transmittance measured by the incident of linearly polarized light and $\tau p\min$ is the minimum value of luminous transmittance measured by the incident of linearly polarized light. $\tau\max$ and $\tau p\min$ are the values that express Ax and Az as the luminous transmittance.

$\tau p\max$ and $\tau p\min$ are determined by using a spectrophotometer manufactured by Shimadzu Corporation (UV-3600) with an incident light that is vertical polarization.

Its degree of polarization was more than 99%. Thus, it is satisfactory as a practical matter.

TABLE 1

Compositions and concentrations of dyes

| | Dichroic organic dye composition | Concentration in dyeing solution | | | Coloration organic dye composition | Concentration in dyeing solution | | |
|---|---|---|---|---|---|---|---|---|
| | | blue | red | yellow | | blue | red | yellow |
| Comparative example 1 | A | 6.96 | 1.04 | 1.84 | | | | |
| Comparative example 2 | A | 10.2 | 5.81 | 6.80 | | | | |
| Comparative example 3 | A | 2.46 | 12.2 | 0.00 | | | | |
| Examples 1 | A | 0.87 | 0.10 | 0.23 | a | 0.96 | 0.57 | 0.92 |
| Examples 2 | A | 0.87 | 0.10 | 0.23 | a | 12.2 | 0.12 | 2.30 |
| Examples 3 | A | 0.87 | 0.10 | 0.23 | a | 0.12 | 0.90 | 0.47 |
| Examples 4 | A | 0.87 | 0.10 | 0.23 | b | 0.52 | 0.00 | 1.55 |
| Examples 5 | A | 0.87 | 0.10 | 0.23 | b | 0.64 | 0.00 | 0.11 |
| Examples 6 | A | 0.87 | 0.10 | 0.23 | b | 0.07 | 0.80 | 0.00 |

TABLE 2

Color tones of produced polarizing film

| | Transmittance (%) | Color tone | | | Polarization degree (%) | Color by visual observation |
|---|---|---|---|---|---|---|
| | | L* | a* | b* | | |
| Comparative example 1 | 14.5 | 45.0 | −1.8 | 1.7 | 99.9up | gray |
| Comparative example 2 | 14.6 | 45.0 | −8.4 | −0.8 | 99.9up | greenish gray |
| Comparative example 3 | 14.9 | 45.5 | 41.0 | −1.2 | 99.6 | strong purply red |
| Examples 1 | 15.6 | 46.5 | 1.6 | 0.4 | 99.8 | gray |
| Examples 2 | 15.5 | 46.3 | −46.4 | 0.8 | 99.1 | Brilliant bluish green |
| Examples 3 | 14.1 | 44.4 | 31.7 | −1.5 | 99.7 | dull purply red |
| Examples 4 | 18.8 | 50.4 | −17.9 | 27.1 | 99.6 | dull yellowish green |
| Examples 5 | 19.0 | 50.7 | −8.6 | −15.5 | 99.2 | dull greenish blue |
| Examples 6 | 19.4 | 51.2 | 22.6 | −14.2 | 99.5 | dull reddish purple |

As is clearly understood from these examples, in colored polarizing films that are produced by using the dichroic organic dye composition and the coloration organic dichroic dye composition, not depending on the properties of (wavelength) absorbance of the dichroic organic dye composition, but owing to the properties of (wavelength) absorbance of the coloration organic dichroic dye composition, polarizing films that have various color tones can be produced.

Production of Colored Polarizing Sheets and Colored Lens

Examples 7-12 and Comparative Example 4 were embodiments for producing the colored polarizing sheet and the colored polarizing lens from the colored polarizing film of the present invention.

(A) Producing Polarizing Film

As shown in Table 3, the dichroic organic dye composition and the coloration organic dyes composition were prepared. Example 12 was obtained by reducing the transmittance of Example 7 to 12% while the ratio of the absorbed amount of the coloration dye composition used in Example 7 was maintained. The dichroic ratios in the Examples were the values of maximal absorption wavelengths obtained under the conditions to obtain the dichroic ratio of 80 at the wavelength of 600 nm in the polarizing film produced by dyeing it with iodine.

(1) Dichroic Organic Dye Compositions

The dichroic organic dye compositions to impart the degree of polarization were prepared as follows.

Dichroic organic dye composition A: C.I.Direct Blue 237 (blue, 19.9), C.I.DirectRed 81 (red, 22.0), C.I.Direct Orange 39 (yellow, 23.6)

Dichroic organic dye composition B: C.I.Direct Blue 78 (blue, 9.2), C.I.Direct Red 254 (red, 10.9), C.I.Direct Yellow 12 (yellow, 9.0)

(2) Coloration Organic Dye Compositions

The coloration organic dye compositions to impart color tones were prepared as followed.

Coloration organic dye composition a: C.I.Direct Blue 86 (blue 1, 1.5), C.I.Direct Blue 108 (blue 2, 1.6), C.I.Direct Red 225 (red, 2.6), C.I.Mordant Yellow 8 (yellow, 1.7)

Coloration organic dye composition b: C.I.Direct Blue 86 (blue1, 1.5), C.I.Direct Blue 108 (blue 2, 1.6), C.I.Direct Red 227 (red, 1.3), C.I.Mordant Yellow 8 (yellow, 1.7)

Coloration organic dye composition c: C.I.Direct Blue 86 (blue1, 1.5), C.I.Direct Blue 108 (blue 2, 1.6), C.I.Direct Red 225 (red, 2.6), C.I.Mordant Yellow 5 (yellow, 2.3)

Coloration organic dye composition d: C.I.Direct Blue 86 (blue 1, 1.5), C.I.Direct Blue 108 (blue 2, 1.6), C.I.Direct Red 227 (red, 1.3), C.I.Mordant Yellow 5 (yellow, 2.3)

Coloration organic dye composition e: C.I.Reactive Blue 235 (blue 1, 1.1), C.I.AcidRed 336 (red, 1.5), C.I.Reactive Yellow 167 (yellow, 2.2)

(3) Producing Polarizing Film

Polyvinyl alcohol (Kuraray Co., Ltd., trade name: VF-PS#7500) was swollen in water at 35° C. for 270 seconds while being stretched two-fold. After that, it was dyed in an aqueous solution containing dye compositions disclosed on Table 1 and 10 g/L of an anhydrous sodium sulfate at 35° C. During this process, it was stretched four-fold. This dyed film was immersed in an aqueous solution containing 2.3 g/L of nickel acetate and 4.4 g/L of boric acid at 35° C. for 120 seconds while being stretched 5.6-fold. The film was dried at room temperature for 3 minutes in a state wherein the tension was retained and then subjected to a heating treatment at 110° C. for 3 minutes, whereby a polarizing film was obtained.

TABLE 3

| | | Compositions and concentrations of dyes | | | | | | | |
|---|---|---|---|---|---|---|---|---|---|
| | Dichroic organic dye composition | Concentration in dyeing solution (g/L) | | | Coloration organic dye composition | Concentration in dyeing solution (g/L) | | | |
| | | blue | red | yellow | | blue 1 | blue 2 | red | yellow |
| Examples 7 | A | 0.87 | 0.10 | 0.23 | a | 0.12 | 0.62 | 0.24 | 0.61 |
| Examples 8 | A | 0.87 | 0.10 | 0.23 | b | 0.13 | 0.51 | 0.25 | 0.57 |
| Examples 9 | A | 0.87 | 0.10 | 0.23 | c | 0.12 | 0.50 | 0.22 | 0.38 |
| Examples 10 | A | 0.87 | 0.10 | 0.23 | d | 0.13 | 0.52 | 0.27 | 0.43 |
| Examples 11 | A | 0.87 | 0.10 | 0.23 | e | 0.26 | | 0.19 | 0.33 |
| Examples 12 | A | 0.87 | 0.10 | 0.23 | a | 0.70 | 1.42 | 0.38 | 1.40 |
| Comparative example 4 | B | 0.94 | 0.11 | 0.13 | | | | | |

(B) Aromatic Polycarbonate Polarizing Sheet

A urethane-based adhesive was applied to the polarizing film obtained in (A) using a bar coater #12, then dried at 70° C. for 10 minutes. After that, an aromatic polycarbonate sheet having a thickness of 0.3 mm and a retardation value of 5500 nm (Mitsubishi Gas Chemical Co., Inc.) was bonded to the polarizing film using a laminating machine so that both the stretch axis of the aromatic polycarbonate sheet and the stretch axis of the polarizing film were in a direction horizontal to the polarizing lens. The adhesive was applied to the polarizing film side of the laminated sheet in the same manner as above, and another aromatic polycarbonate sheet was bonded thereto in the same way, whereby an aromatic polycarbonate polarizing sheet was obtained. The thickness of the coated adhesive after curing was 9 to 11 μm.

(C) Measurement of Absorbance of Aromatic Polycarbonate Polarizing Lens

The transmittance and color tone of the prepared aromatic polycarbonate polarizing sheet were measured using a spectrophotometer manufactured by Shimadzu Corporation (UV-3600). The results are shown in Table 4.

(D) Aromatic Polycarbonate Polarizing Lens

The aromatic polycarbonate polarizing sheet obtained in (b) was subjected to the curving process using a mold having a base curve of 7.95 (curvature radius 66.67 mm). In the curving process, the forming was carried out under the following conditions: mold temperature: 137° C., and retention time: 1200 seconds. The base curve as used herein refers to the curvature of the front surface of the lens, and it is a value obtained by dividing 530 by the curvature radius (in millimeters). There were no cracks in the polarizing film of the aromatic polycarbonate polarizing lens after the curving process. The transmittance and color tone of the aromatic polycarbonate polarizing lens after the curving process of samples measured in a manner similar to that in (c), and the color difference ΔE*ab in the CIE1976 (L*a*b*) color space before and after forming are shown in Table 1. The color difference was obtained by the following formula:

Color difference: $\Delta E^*ab = ((\Delta L^*)^2 + (\Delta a^*)^2 + (\Delta b^*)^2)^{1/2}$

TABLE 4

Color tones of produced polycarbonate polarizing sheet before and after curving process

| | Transmittance | Color tone | | | Polarization degree | Transmittance | Color tone | | | Polarization degree | Color difference at curving process |
|---|---|---|---|---|---|---|---|---|---|---|---|
| | (%) | L* | a* | b* | (%) | (%) | L* | a* | b* | (%) | After−before |
| Examples 7 | 19.0 | 50.7 | 0.3 | −3.9 | 99.2 | 18.1 | 49.6 | −1.1 | −4.2 | 99.4 | 1.8 |
| Examples 8 | 21.3 | 53.3 | −0.6 | −3.1 | 98.7 | 20.0 | 51.9 | −0.8 | −3.0 | 99.2 | 1.4 |
| Examples 9 | 20.0 | 51.9 | −1.0 | −4.4 | 99.5 | 19.0 | 50.7 | −2.7 | −3.3 | 99.6 | 2.3 |
| Examples 10 | 20.0 | 51.8 | −2.1 | −3.7 | 99.1 | 18.7 | 50.4 | −2.6 | −2.2 | 99.1 | 2.1 |
| Examples 11 | 22.1 | 54.1 | −1.0 | −3.3 | 98.3 | 20.6 | 52.5 | −1.0 | −2.2 | 98.7 | 1.9 |
| Examples 12 | 12.7 | 42.2 | −6.1 | −5.3 | 98.8 | 12.0 | 41.3 | −8.2 | −4.9 | 99.6 | 2.3 |
| Comparative example 4 | 20.3 | 52.2 | −1.8 | −2.5 | 99.3 | 17.4 | 48.7 | −0.4 | −2.4 | 99.1 | 3.7 |

As is clearly understood from these examples, in the aromatic polycarbonate polarizing sheet that is dyed by using the dichroic organic dye composition only, the color difference before and after the processing steps was 3.7. On the other hand, the aromatic polycarbonate polarizing sheets that are dyed by using the dichroic organic dye composition and the coloration organic dyes composition shows the color differences before and after the processing steps were 1.4 to 2.3. Thus, the polarizing sheet of the present invention shows small changes in color tone and transmittance between before and after the processing steps.

INDUSTRIAL APPLICABILITY

By the present invention, the polarizing films, the polarizing sheets, and the polarizing lenses that have various combinations of degree of polarization and transmittance and desired color tone can be provided in an industrial level.

The invention claimed is:

1. A method for producing a colored polarizing film of a desired color, wherein the method for producing the polarizing film comprises swelling a polyvinyl alcohol film with water, uniaxially stretching it, dyeing it with a dichroic organic dye, and drying it, wherein the dichroic organic dye comprises a dichroic organic dye composition and a coloration organic dye composition, wherein the dichroic organic dye composition comprises a combination of dichroic organic dyes having a dichroic ratio of 13 or higher, used in an amount to keep the degree of polarization at 90% or more, and wherein the coloration organic dye composition comprises a combination of dyes having an extremely low dichroic ratio of 4 or less or substantially having no dichroic ratio, used in an amount yielding a desired dyed color, wherein a target percentage of total light transmission is selected, wherein the dichroic organic dyes of the dichroic organic dye composition are selected such that, when combined, they are substantially colorless, and contribute to obtain a polarizing degree of interest and to provide a percentage of light transmission that exceeds the target percentage of total light transmission, and wherein the dyes of the coloration organic dye composition are selected so as to have a color of interest and selected to have a dichroic ratio and an amount to maintain the polarizing degree of interest while reducing the percentage of light transmission provided by the dichroic organic dyes of the dichroic organic dye composition such that the colored polarizing film has the target percentage of total light transmission.

2. The method for producing the colored polarizing film of claim 1, wherein the dichroic organic dye composition and the coloration organic dye composition are used in an aqueous solution.

3. The method for producing the colored polarizing film of claim 1, wherein the dichroic organic dye composition is used in an amount to obtain the lower limit of the required degree of polarization.

4. The method for producing the colored polarizing film of claim 1, wherein the coloration organic dye composition is used in an amount such that the transmittance of the film is 10% or more and is at least 5% smaller than the transmittance of a polarizing film obtained by using the dichroic organic dye composition only.

5. A colored polarizing sheet that comprises a polarizing film produced by swelling a polyvinyl alcohol film with water, uniaxially stretching it, dyeing it with a dichroic organic dye, and drying it, and transparent plastic sheets attached on both sides of the polarizing film by an adhesive, wherein the dichroic organic dye used in producing the film comprises a dichroic organic dye composition and a coloration organic dye composition, wherein the dichroic organic dye composition comprises a combination of organic dyes having a dichroic ratio of 13 or higher, used in an amount to keep the degree of polarization at 90% or more, and wherein the coloration organic dye composition comprises a combination of dyes having an extremely low dichroic ratio of 4 or less or substantially having no dichroic ratio, used in an amount yielding a desired dyed color, wherein a target percentage of total light transmission is selected, wherein the dichroic organic dyes of the dichroic organic dye composition are selected such that, when combined, they are substantially colorless, and contribute to obtain a polarizing degree of interest and to provide a percentage of light transmission that exceeds the target percentage of total light transmission, and wherein the dyes of the coloration organic dye composition are selected so as to have a color of interest and selected to have a dichroic ratio and an amount to maintain the polarizing degree of interest while reducing the percentage of light transmission provided by the dichroic organic dyes of the dichroic organic dye composition such that the colored polarizing film has the target percentage of total light transmission.

6. The colored polarizing sheet of claim 5, wherein the dichroic organic dye composition and the coloration organic dye composition are used in an aqueous solution.

7. The colored polarizing sheet of claim 5, wherein the dichroic organic dye composition is used in an amount to obtain the lower limit of the required dichroic ratio.

8. The colored polarizing sheet of claim 5, wherein the coloration organic dye composition is used in an amount such that the transmittance of the film is 10% or more and is at least 5% smaller than that the transmittance of a polarizing film obtained by using the dichroic organic dyeing composition only.

9. The colored polarizing sheet of claim 5, wherein the material of at least one of the transparent plastic sheets is one or more selected from the group consisting of: aromatic polycarbonates, polyacrylate, acetylcellulose, polyamide, and a composition of an aromatic polycarbonate and alicyclic polyester.

10. The colored polarizing sheet of claim 5, wherein at least one of the transparent plastic sheets is an aromatic polycarbonate sheet that has a thickness of from 0.1 mm to 1 mm and the sheet provides a retardation value of 3000 nm or higher.

11. The colored polarizing sheet of claim 5, wherein in the adhesive layer is a two-liquid type thermosetting polyurethane resin that consists of a curative agent that comprises a polyurethane prepolymer and a hydroxyl (poly) acrylate.

12. A colored polarizing lens obtained by: laminating with a transparent plastic sheet via an adhesive layer to each surface of a polarizing film that is made by swelling a polyvinyl alcohol resin with water, uniaxially stretching it, dyeing it with a dichroic organic dye, and drying it to obtain a polarizing sheet; curving the polarizing sheet so as to impart spherical or aspherical surfaces thereto to obtain a curved polarizing lens or curving the polarizing sheet so as to impart spherical or aspherical surfaces thereto and injecting a transparent resin onto the concave surface to obtain an injection-molded lens, wherein the dichroic organic dye is made by using a dichroic organic dye composition and a coloration organic composition, wherein the dichroic organic dye composition used to produce the polarizing film comprises a combination of dichroic organic dyes having a dichroic ratio of 13 or higher and is used in an amount to keep the degree of polarization at 90% or more, and wherein the coloration organic dye composition comprises a combination of dyes having an extremely low dichroic ratio of 4 or less or substantially having no dichroic ratio, wherein a target percentage of total light transmission is selected, wherein the dichroic organic dyes of the dichroic organic dye composition are selected such that, when combined, they are substantially colorless, and contribute to obtain a polarizing degree of interest and to provide a percentage of light transmission that exceeds the target percentage of total light transmission, and wherein the dyes of the coloration organic dye composition are selected so as to have a color of interest and selected to have a dichroic ratio and an amount to maintain the polarizing degree of interest while reducing the percentage of light transmission provided by the dichroic organic dyes of the dichroic organic dye composition such that the colored polarizing film has the target percentage of total light transmission, the resulting polarizing film being a polarizing film of a desired color.

13. The colored polarizing lens of claim 12, wherein the polarizing film is dyed by using the dichroic organic dye composition and the coloration organic dye composition in an aqueous solution.

14. The colored polarizing lens of claim 12, wherein the organic dichroic dye composition is used in an amount to obtain the lower-limit of the required dichroic ratio.

15. The colored polarizing lens of claim 12, wherein the coloration organic dye composition is used in an amount so that the transmittance of the film is 10% or more and is at least 5% smaller than the transmittance obtained by using the dichroic organic dyeing composition only.

16. The colored polarizing lens of claim 12, wherein the material of at least one of the transparent plastic sheets is one or more selected from the group consisting of: aromatic polycarbonates, polyacrylate, acetylcellulose, polyamide, and a composition of an aromatic polycarbonate and alicyclic polyester.

17. The colored polarizing lens of claim 12, wherein at least one of the transparent plastic sheets is an aromatic polycarbonate sheet that has a thickness of from 0.1 mm to 1 mm and the sheet provides a retardation value of 3000 nm or higher.

18. The colored polarizing lens of claim 12, wherein the adhesive agent in the adhesive layer is a two-liquid type thermosetting polyurethane resin that consists of a curative agent that comprises a polyurethane polymer and a hydroxyl (poly) acrylate.

19. A method for producing a colored polarizing lens consisting of: laminating with a transparent plastic sheet through an adhesive layer to each surface of a polarizing film that is made by swelling a polyvinyl alcohol resin with water, uniaxially stretching it, dyeing it with a dichroic organic dye, and drying it to obtain a polarizing sheet; curving the polarizing sheet so as to impart spherical or aspherical surfaces thereto to obtain a curved polarizing lens or curving the polarizing sheet so as to impart spherical or aspherical surfaces thereto and injecting a transparent resin onto the concave surface of the curved polarizing sheet to obtain an injection-molded lens; wherein the dichroic organic dye is made by using a dichroic organic dye composition and a coloration organic composition, wherein the dichroic organic dye comprises a dichroic organic dye composition and an coloration organic dye composition, wherein the dichroic organic dye composition comprises a combination of organic dyes having a dichroic ratio of 13 or higher, used in an amount to keep the degree of polarization at 90% or more, and wherein the coloration organic dye composition comprises a combination of dyes having an extremely low dichroic ratio of 4 or less or substantially having no dichroic ratio, wherein a target percentage of total light transmission is selected, wherein the dichroic organic dyes of the dichroic organic dye composition are selected such that, when combined, they are substantially colorless, and contribute to obtain a polarizing degree of interest and to provide a percentage of light transmission that exceeds the target percentage of total light transmission, and wherein the dyes of the coloration organic dye composition are selected so as to have a color of interest and selected to have a dichroic ratio and an amount to maintain the polarizing degree of interest while reducing the percentage of light transmission provided by the dichroic organic dyes of the dichroic organic dye composition such that the colored polarizing film has the target percentage of total light transmission, the resulting coloration polarized film being a desired color and obtained by using a coloration organic dye composition in an amount yielding the desired color.

20. The method for producing the colored polarizing lens of claim 19, wherein the polarizing sheet is dyed by using the dichroic organic dye composition and the coloration organic dye composition in an aqueous solution.

21. The method for producing the colored polarizing lens of claim 19, wherein the organic dichroic dye composition is used in an amount to obtain the lower limit of the dichroic ratio to be required.

22. The method for producing of the colored polarizing lens of claim 19, wherein the coloration organic dye composition is used in an amount such that the transmittance of the film is 10% or more and is at least 5% smaller than the transmittance of a polarizing film obtained by using the dichroic organic dyeing composition only.

23. The method for producing of the colored polarizing lens of claim 19, wherein the material of at least one of the transparent plastic sheets is one or more selected from the group consisting of: aromatic polycarbonates, polyacrylate, acetylcellulose, polyamide, and a composition of an aromatic polycarbonate and alicyclic polyester.

24. The method for producing of the colored polarizing lens of claim 19, wherein at least one of the transparent plastic sheets is an aromatic polycarbonate sheet that has a thickness of from 0.1 mm to 1 mm and the sheet provides a retardation value of 3000 nm or higher.

25. The method for producing a colored polarizing lens of claim 19, wherein the adhesive agent in the adhesive layer is a two-liquid type thermosetting polyurethane resin that consists of a curative agent that comprises a polyurethane polymer and a hydroxyl (poly) acrylate.

* * * * *

UNITED STATES PATENT AND TRADEMARK OFFICE
CERTIFICATE OF CORRECTION

PATENT NO.        : 9,897,823 B2
APPLICATION NO.   : 14/422730
DATED             : February 20, 2018
INVENTOR(S)       : Kimura et al.

Page 1 of 1

It is certified that error appears in the above-identified patent and that said Letters Patent is hereby corrected as shown below:

On the Title Page

Item (56), Other Publications, page 2, Column 2, Line 5, please change "an english" to -- an English --

In the Claims

Column 25, Line 14 (Claim 8, Line 4) please change "that the" to -- that of the --

Column 26, Line 48 (Claim 19, Line 16) please change "and an" to -- and a --

Signed and Sealed this
Second Day of October, 2018

Andrei Iancu
*Director of the United States Patent and Trademark Office*